United States Patent [19]

Heinzl et al.

[11] Patent Number: 4,716,418

[45] Date of Patent: Dec. 29, 1987

[54] APPARATUS AND METHOD FOR EJECTING INK DROPLETS

[75] Inventors: Joachim Heinzl, Munich; Guenter Rosenstock, Ottobrunn, both of Fed. Rep. of Germany

[73] Assignee: Siemens Aktiengesellschaft, Berlin and Munich, Fed. Rep. of Germany

[21] Appl. No.: 673,207

[22] Filed: Nov. 19, 1984

Related U.S. Application Data

[63] Continuation-in-part of Ser. No. 488,440, Apr. 25, 1983, abandoned.

[30] Foreign Application Priority Data

May 7, 1982 [DE] Fed. Rep. of Germany ....... 3217248

[51] Int. Cl.$^4$ .............................................. G01D 15/16

[52] U.S. Cl. ................................. 346/1.1; 346/140 R

[58] Field of Search ........................... 346/140, 1.1, 75

[56] References Cited

U.S. PATENT DOCUMENTS

| | | | |
|---|---|---|---|
| 3,683,212 | 8/1972 | Zoltan | 346/140 X |
| 3,832,579 | 8/1974 | Arndt | 346/140 X |
| 4,104,646 | 8/1978 | Fischbeck | 346/140 |
| 4,112,433 | 9/1978 | Vernon | 346/140 X |
| 4,161,670 | 7/1979 | Kern | 346/140 X |
| 4,233,610 | 11/1980 | Fischbeck | 346/140 |
| 4,282,535 | 8/1981 | Kern | 346/140 |
| 4,284,996 | 8/1981 | Greve | 346/140 |
| 4,323,908 | 4/1982 | Lee | 346/140 R |
| 4,369,455 | 1/1983 | McConica | 346/140 |
| 4,379,246 | 4/1983 | Guntersdorfer | 346/140 X |
| 4,491,851 | 1/1985 | Mizuno | 346/140 X |
| 4,523,201 | 6/1985 | Liker | 346/140 X |

OTHER PUBLICATIONS

Bogy et al.; Experimental and Theoretical Study of Wave Propagation Phenomena in Drop-On-Demand Ink Jet Devices, IBM J. Res. Develop., vol. 28, No. 3, May 1984, pp. 314–321.

Kyser et al.; Design of an Impulse Ink Jet, Journal of Applied Photographic Engr., vol. 7, No. 3, Jun. 1981, pp. 73–79.

*Primary Examiner*—Joseph W. Hartary

*Attorney, Agent, or Firm*—Hill, Van Santen, Steadman & Simpson

[57] ABSTRACT

Apparatus for the ejection of ink droplets having a fluid filled channel having a discharge opening at one end, and a cross-sectional expansion at the other, so that pressure waves within the channel produce by a tubular transducer are reflected from the cross-sectional expansion with reversal of operational sign or polarity. Unipolar pulses having symmetrically and trailing edges excite the transducer, and the droplet is ejected from the discharge opening as a result of the superimposed directed and reflected pressure waves produced by the transducer.

20 Claims, 4 Drawing Figures

APPARATUS AND METHOD FOR EJECTING INK DROPLETS

BACKGROUND

This is a continuation in part of copending application Ser. No. 488,440, filed Apr. 25, 1983 now abandoned.

FIELD OF THE INVENTION

The present invention relates to an arrangement for ejecting ink droplets, especially in connection with an ink jet printer of the dot matrix type.

THE PRIOR ART

Ink jet printers are known in which droplets are ejected by exciting a piezo electric tranducer. Such apparatus is described in the German AS No. 25 48 691, where ejecting of ink droplets is initiated by a piezo electrical transducer surrounding an ink channel which is first expanded and then contracted by application of a first pulse of one polarity and a second pulse of the opposite polarity. Although this apparatus is effective, it is desirable to reduce the complexity of the drive circuitry by providing circuitry which functions effectively with a single, unipolar pulse. It is also desirable to provide apparatus for ensuring that the ejected droplet should be allowed to assume a spherical form very quickly after ejection, and that following droplets are influenced as little as possible by previous events, even if they are triggered in rapid sequence.

BRIEF DESCRIPTION OF THE PRESENT INVENTION

It is a principal object of the present invention to provide an apparatus and method which meets the above requirements. A particular object is to provide an apparatus and method for employing a single unipolar pulse to enable the ejection of droplets at high speed which quickly assume a spherical form.

In one embodiment of the present invention, there is provided a fluid filled channel surrounded by a tubular piezo electric transducer over a part of its length, and including means for applying a single unipolar pulse to the transducer, causing an expansion of its interior diameter. A cross-sectional expansion is provided at the reservoir end of the channel, and a pressure wave, generated by operation of the transducer, is reflected with opposite polarity at the cross-sectional expansion, whereby the direct and reflected pressure waves from the transducer are superimposed and cooperate to bring about ejection of a fluid droplet.

The present invention achieves the advantage of providing for droplet ejection using a unipolar pulse with identical leading and trailing edges, which brings about a reduction in a input power requirements. In addition, the sequence of forming an ejected droplet is precisely defined in time, which leads to very fast formation of spherical droplets. The replacement of the fluid loss due to the ejected droplet occurs within a very short time, and is substantially independent of surface tensions. It is therefore unnecessary to rely on capillary forces to effect a refilling of the fluid channel, so that the idle condition (in which the apparatus is ready for ejection of a subsequent droplet) is more quickly achieved, and there is substantially no effect on the formation and ejection of subsequent droplets.

A further advantage achieved by the present invention is that the supply lines and ink feeds are decoupled from the events in the channel without complicated measures being required for that purpose.

BRIEF DESCRIPTION OF THE DRAWINGS

Reference will now be made to the accompanying drawings in which.

DESCRIPTION OF THE PREFERRED EMBODIMENT

Figure 1:
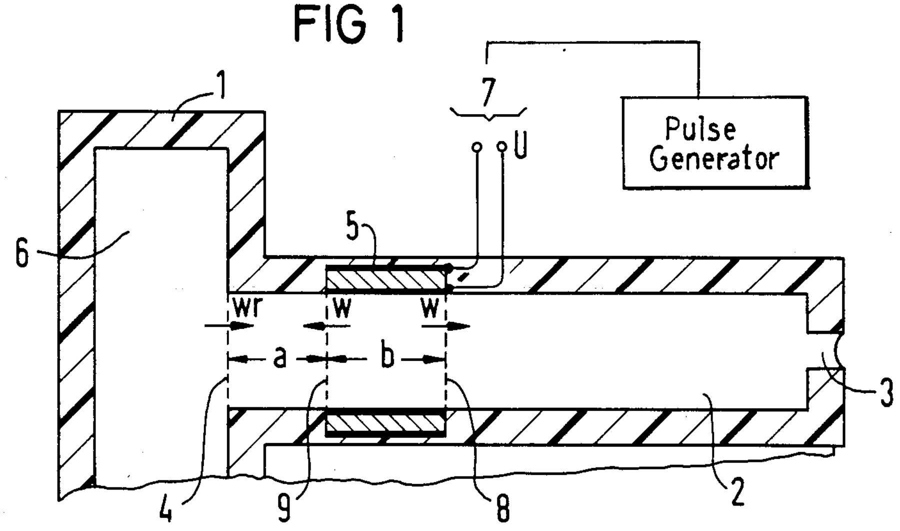
FIG. 1 is a cross-sectional view of an ink channel illustrating an exemplary embodiment of the present invention.

Referring now to FIG. 1, an ink channel 2 is provided, having a discharge opening 3 with a diameter which is small in comparison to the diameter of the ink channel. A cross-sectional expansion 4 is provided at the other end of the ink channel 2 by which the ink channel is connected to an ink chamber 6 defined by a housing leading to an ink reservoir (not shown).

The cross-sectional expansion represents a reflecting termination of the channel 2, at which pressure waves are reflected while reversing their operational sign, i.e., the polarity of the pressure wave is reversed. This reflection takes place nearly completely, if one neglects losses due to the mechanical structure.

The ink chamber 6 is connected by means of a feed channel to an ink reservoir (not shown) which may be placed somewhat lower than the discharge opening 3 of the ink channel. This maintains a less than atmospheric pressure on the ink within the channel 2, so that no ink escapes through the discharge opening 3 in the idle state. In one embodiment, the ink channel 2 may be formed integrally with the housing 1, in the form of a recess or the like.

The ink channel 2 is surrounded by a tubular transducer 5 in the proximity of the cross-sectional expansion 4. The transducer 5 is a polarized piezo ceramic tube, which changes its internal diameter in response to application of control pulses U applied thereto. A voltage or pulse of one polarity applied to the transducer results in a constriction of the transducer 5, whereas a voltage or pulse of the opposite polarity brings about an expansion of the transducer. The transducer 5 may be, for example, connected to outputs of a character generator of a printer, indicated at 7, so that the control pulses applied to the transducer 5 operate to form the dots of characters, in the operation of an ink jet printer. The transducer 5 surrounds the channel 2 only throughout its length b, and is spaced by distance a from the cross-sectional expansion 4.

Circuits for generating unipolar pulses which are suitable for the drive of transducers of the type employed here are generally known. Such a circuit is disclosed, for example, in the U.S. Pat. No. 4,398,204.

Figure 2:
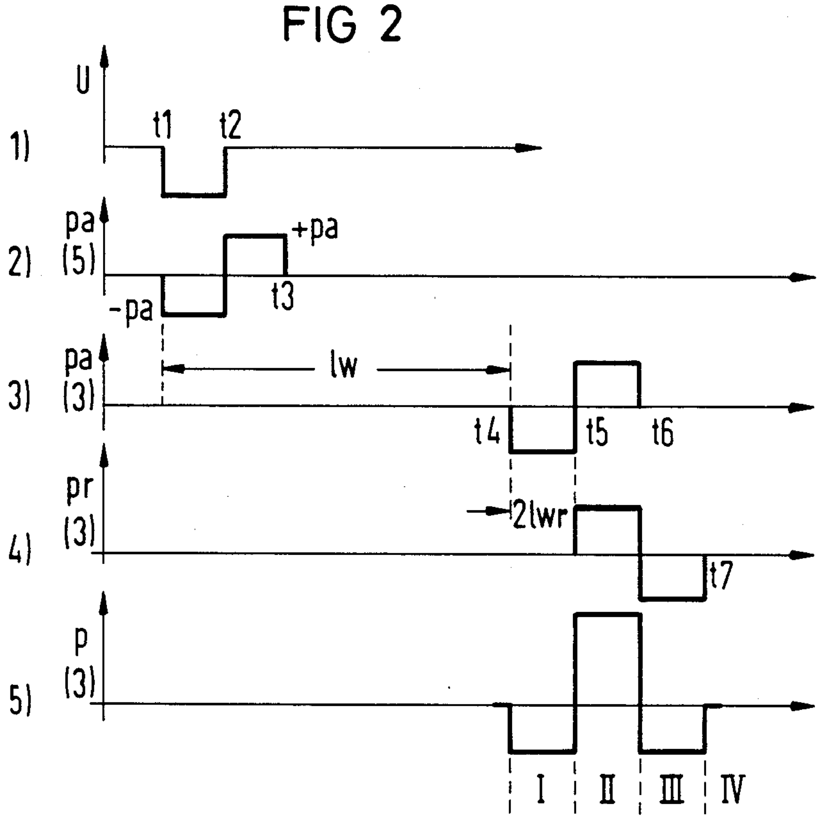
FIG. 2 shows a group of waveforms which illustrate operation of the apparatus of FIG. 1.

The events which take place during formation and ejection of a droplet, by exciting the transducer 5 with a unipolar drive pulse, will be described in connection with the waveforms of FIG. 2. In operation, a drive pulse U of duration tj, having leading and trailing edges of identical slope, and poled opposite the polarization direction of the transducer 5, is applied to the transducer 5 at time t1, and turned off at time t2, as shown in FIG. 2, line 1. This pulse results in a negative going part −pa of a pressure wave in the volume of the ink channel surrounded by the transducer 5, due to the expansion of this volume caused by the polarity of the drive pulse U. The negative part −pa of the wave propagates from the transducer 5 in both directions within the channel 2. At time t2, when the pulse ends, the transducer 5 again assumes its idle or quiescent condition, thereby constricting the volume within the transducer 5, and generating a positive part +pa of a pressure wave. This part is also propagated in both directions in the channel 2 from the transducer 5. The propagation of negative and positive parts both occur at the speed of sound within the ink channel 2. FIG. 2, line 2 shows the negative and positive pressure waves produced by the unipolar pulse shown in line 1 of FIG. 2.

The dimensions shown in FIGS. 1 and 2, and other parameters which are referred to hereinafter are:

a: distance of the transducer from the cross-sectional expansion, i.e. from the point of reflection having a reflection factor of r=−1;
b: length of the transducer;
tj: length of the drive pulse (pulse duration);
tL: length of a printing signal (printing signal duration);
vR: speed of sound in the transducer;
vK: speed of sound in the ink channel;
tv: delay time of the reflected printing signal;
d1: diameter of the ink reservoir chamber;
d2: diameter of the ink channel;
d3: diameter of the discharge opening.

The direct pressure wave is shown in line 3 of FIG. 2 at a later time, after it has transversed to the opening 3 at the end of the channel 2. Proceeding in the direction toward the discharge opening 3, the negative and positive parts of the pressure wave arrive at the discharge opening 3 at times t4, t5 and t6, respectively, after a transit time of 1w.

The small piezo tube provided as transducer 5 is thereby first expanded somewhat, i.e. its inside diameter first becomes somewhat larger and it is then restored to its initial position after the time tj. As a result thereof, an underpressure is first produced in the inside of the ink channel and an overpressure is subsequently generated. The length tL of the underpressure and overpressure signal[s], i.e. the printing signal duration is determined by the sound propagation speed vR in the small piezo tube 5, the relationship:

$$tL = \frac{b}{vR}.$$

The transit time lw is defined by the sound propagation speed vk in the ink channel 2. In an ink channel having the length c, the transit time is:

$$lw = \frac{c}{vK}$$

The pressure wave propagrated in the opposite direction, toward the cross-sectional expansion 4, is reflected with opposite sign or polarity at the expansion 4, and arrives at the discharge opening 3 at a later time than the direct wave, as shown in line 4 of FIG. 2. At the cross-sectional expansion 4, the ink channel is practically open at its channel end opening into the ink supply part (d2, d1). For an open channel, the reflection factor for pressure waves arriving there is r=−1, i.e. a reflection of the arriving pressure signal occurs with reversal of operational sign. The time differential is a function of the distance a between the transducer 5 and the cross-sectional expansion 4. The various parts of the reflected wave arrives at the discharge opening 3 at times t5, t6 and t7, as shown in line 4. The arrival time of the reflected pressure wave wr is delayed by a time tv relative to the arrival time of the non-reflected pressure wave w. This delay time tv results from the fact that the reflected pressure wave wr must traverse the path a twice, and the path b once, in addition to the path c. Accordingly, the delay time tv is:

$$tv = \frac{2a}{vK} + \frac{b}{vR}$$

Thus, the pressure on the fluid at the discharge opening 3 is the sum of the direct and reflected pressure waves, which is illustrated in line 5 of FIG. 2.

The first to arrive part of the direct pressure wave (phase I) brings about a retraction of the ink into the discharge opening 3. The immediately following positive part of the direct pressure wave, superimposed with the reflected negative part, which after being reflected arrives as a positive part, leads to a great pressure rise in the area of the discharge opening 3 (phase II). The meniscus of the ink is thereby greatly accelerated in the direction of the discharge opening 3, so that an ink droplet begins to emerge from the opening with a high velocity, allowing it to be carried to the printer's recording medium which is spaced from the discharge opening 3, in a short time. The negative part of the reflected pressure wave arrives immediately thereafter (phase III), resulting in severing the droplet, and forming a new meniscus which is retracted into the opening 3 to its initial position. At the conclusion of this part of the wave form, the idle or quiescent condition (phase IV) is again resumed.

It has been found advantageous for the duration tj of the drive pulse U, i.e., the time duration between expansion of the transducer 5 and its return to normal volume, to be equal to or greater than the transit time of a pressure wave through that part of the ink channel which is surrounded by the transducer 5, with the time required for the expansion per se and the retraction per se being short in comparison to the transit time. It is further advantageous to match the length b of the transducer 5, the duration tj of the applied pulse U, and the interval a by which the transducer 5 is spaced from the cross-sectional expansion 4 to one another, so that the direct and reflected pressure waves arrive at the discharge opening 3 with portions of the direct and reflected pressure waves superimposed as shown in lines 3–5 of FIG. 2. These parameters which are most effective for a given configuration of apparatus may readily be determined by those skilled in the art either through knowledge of the physical characteristics of the configuration or by simple expermentation. The relationship and the matching of these quantities are explained in greater detail below. FIG. 2 shows that an optimum is established when the delay time tv is of such magnitude that the positive part +pa of the reflected wave wr chronologically coincides with the corresponding part of the direct wave at the discharge opening 3. This is the case when tv=tj. As already described above, the delay time tv is dependent on the geometrical parameters of the ink channel 2, and is:

$$tv = \frac{2a}{vK} + \frac{b}{vR}$$

In accord with an illustrative embodiment having the following values:

$b = 20$ mm $vK = 960 \frac{m}{s}$ $vR = 1215 \frac{m}{s}$ $tj = 24.8$ us the value a=4.0 mm is preferred for the distance a.

The invention, of course, is not restricted to these specific values.

The length of the pulse U, if too short, does not impart sufficient energy to the pressure wave formed thereby. If too long, the pressure wave becomes distorted and its positive and negative parts become separated. The length b of the transducer is related to the length of the pulse U because a longer pulse U can be used with a transducer which has a greater length b. The interval a is selected for a given combination of pulse duration and transducer length in order to cause the summation of the waveforms in the manner shown in FIG. 2. The specific values used for these parameters vary with the physical characteristics of the transducer and ink fluid which are used.

The time required for replenishing the ink ejected from the channel 2 is considerably reduced when the present invention is employed, because the ink required for the ejection is already largely available in the first phase I of an ejection sequence. In practical terms, this means that the so-called spray frequency, i.e., the frequency at which successive ink droplets can be ejected, is essentially limited only by the reverberation events normally occurring in the ink channel. These reverberation events are damped in one embodiment of the present invention by employing a soft and damping channel wall for the ink channel 2 between the transducer 5 and the discharge opening 3. Employing an elastic material for the wall apparatus can damp the pressure waves because energy is extracted from the waves by the channel wall stretching to change its diameter in response to passage of the waves. FIG. 1 is an example therefor, where the channel wall outside of the transducer 5 is formed of the casting resin compound of which the write head is constructed.

Alternatively, a hard channel wall can be employed, with the channel being somewhat restricted in that area in which it emerges from the transducer, so that the pressure waves can propagate largely reflection-free into the ink channel, whereas they are reflected at the other end of the channel at the cross-sectional expansion.

Figure 3:
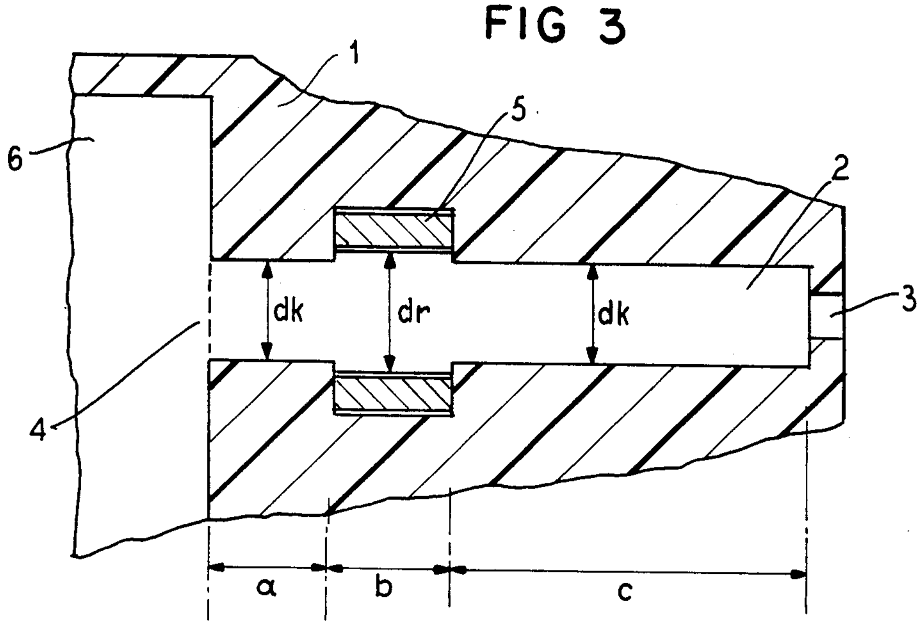
FIG. 3 is an enlarged illustration of an alternative arrangement.

FIG. 3 shows another example. As explained with reference to FIG. 1, the ink channel which connects the ink supply 6 and the discharge opening 3 is molded in a write head 1 formed of a casting resin compound. The transducer 5 in the form of a small piezo tube embracing the ink channel is situated at the distance a from the cross-sectional expansion 4. The ink channel 2 narrows at both sides of the transducer 5, i.e., the diameter dk of the ink channel is smaller than the diameter dr in the region b of the transducer 5. What is achieved with the cross-sectional constriction is that the impedance Z of the ink channel is of exactly the same size in the region b as in the regions a and c. The impedance Z is defined according to $$Z = \frac{\rho \cdot v}{q}$$

whereby $\rho$ is the density of the ink, v is the sound propagation speed and q is the cross-sectional area of the channel. With the above-specified values of vk=960m/s and vR=1215m/s for the sound propagation speed in the ink channel 2 and in the region b encompassed by the transducer 5, respectively, the reduced diameter dk is:

$$dk \approx 0.89 \cdot dr$$

In a further embodiment, it is possible for the reverberation effects to be substantially reduced or eliminated, by applying compensation pulses to the transducer which follow the beginning of the drive pulse by twice the transit time of a pressure wave from the discharge opening up to the cross-sectional expansion, the compensation pulses largely neutralizing the disruptive pressure wave which is reflected at the discharge opening 3, and which procedes into the area of the transducer 5 and is then reflected at the cross-sectional expansion 4. Such compensation pulses are applied to the transducer so that the pressure waves resulting therefrom are superimposed on the disruptive pressure wave and substantially cancel them out. Preferably, such compensation pulses have the same duration as the drive pulses, but a lower energy, because the reverberation is lower in energy than the pressure waves when they are first formed.

Figure 4:
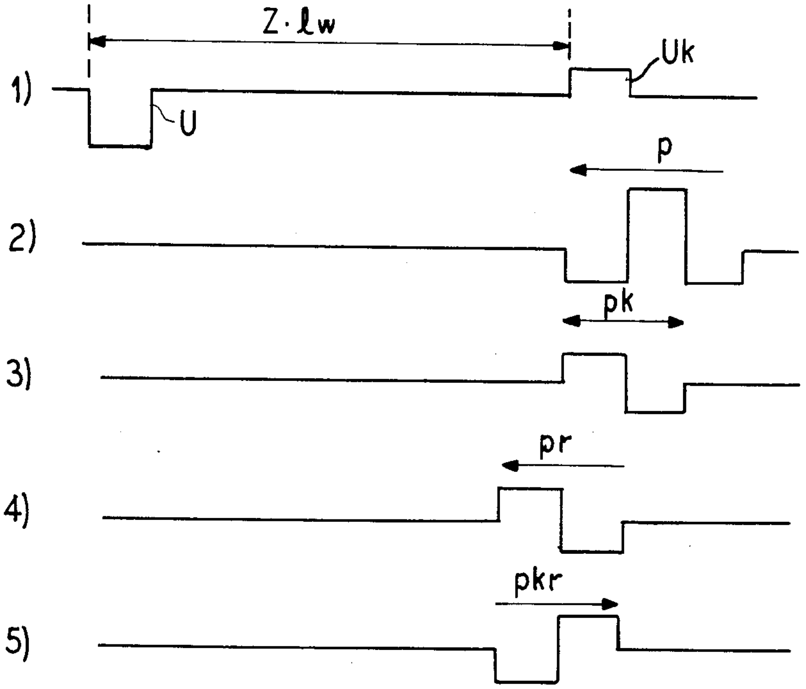
FIG. 4 shows a group of waveforms serving to illustrate operation of the apparatus.

The generation of the compensating pulses occurs in the same manner as the generation of the drive pulses in that appropriately poled control pulses are applied to the transducer. Pressure waves having positive and negative components are generated as a result thereof, as described above. The compensating pulses differ from the drive pulses only on the basis of their polarity and on the basis of the point in time at which they are generated. They must appear opposite in phase to the pressure wave reflected by the nozzle discharge opening and delayed by twice the transit time 1w. FIG. 4 schematically shows the principle of the elimination of reverberation by compensating pulses. A drive pulse U and a compensating pulse Uk delayed by twice the transit time 2·1w are shown in line 1 thereof. Line 2 shows the pressure of the pressure wave p returning to the transducer after reflection at the nozzle discharge opening 3. Since the reflection at the nozzle discharge opening occurs without reversal of operational sign, the pressure curve of the pressure wave p corresponds to the pressure curve shown in FIG. 2, line 5. conditioned by damping influences on the doubled path through the ink channel, however, the pressure curve exhibits lower energy. This also explains why the compensating pulse Uk (line 1) can have less energy than the drive pulse. The pressure wave pk initiated by the compensating pulse Uk is shown in line 3. As already described above, this spreads in both directions proceeding from the transducer. That part proceeding toward the right compensates a part of the incoming pressure wave p except for a residual oscillation pr (shown in line 4) and traverses the transducer in the direction toward the cross-sectional expansion. On this path, the residual oscillation pr encounters the pressure wave pkr reflected upon reversal of operational sign at the cross-sectional expansion. The residual oscillation pr and the reflected pressure wave pkr thereby mutually cancel due to wave interference.

Although the foregoing describes a single ink channel, it will be understood that the single channel may be one of a multitude of ink channels arranged in the known manner to constitute an ink jet printer. An ink jet printer incorporating the present invention can be then manufactured in a particularly advantageous manner by forming the member 1 with a plurality of integral ink channels 2, by means of ejection molding or the like.

It will be apparent to those skilled in the art that various modifications and additions can be made in the apparatus and method of the present invention, without departing from the essential features of novelty thereof, which are intended to be defined and secured by the appended claims.

What is claimed is:

1. Apparatus for ejecting droplets from a fluid-filled channel having a discharge opening comprising, a tubular piezo electric transducer surrounding a part of the length of the said channel, said transducer being adapted to change its internal diameter by expansion and contraction in response to applied drive pulses, and including means for applying to said transducer a pulse poled opposite to the polarization direction of the transducer in order to cause expansion of the interior diameter of the transducer, said channel having a cross-sectional expansion at its end opposite the discharge opening, said transducer surrounding said channel in the proximity of said cross-sectional expansion, whereby the pressure wave generated by said transducer expansion is reflected at said cross-sectional expansion with the reversal of its polarity, said transducer being spaced from said cross-sectional expansion by the distance required for a pressure wave to travel from said transducer to said cross-sectional expansion and for a corresponding reflected pressure wave to travel from said cross-sectional expansion to said transducer in approximately the period of said drive pulse, whereby said reflected pressure wave is summed between said transducer and said discharge opening with the generated pressure wave due to the contraction of the transducer, to provide a composite pressure wave for ejecting a single droplet from said fluid-filled channel.

2. Apparatus according to claim 1, wherein the length of the transducer, the duration of the pulse supplied thereto, and the spacing of the transducer from said cross-sectional expansion are matched to each other whereby the pressure wave generated due to the direct and reflected waves are superimposed to produce at said discharge opening a first phase in which the pressure is reduced from a quiescent valve, a second phase of increased pressure, and a third phase of reduced pressure followed by a quiescent pressure.

3. Apparatus according to claim 1, including means for supplying said transducer with unipolar pulses having symmetrical leading and trailing edges.

4. Apparatus according to claim 1, wherein the time span of the pulse applied to said transducer is greater than or equal to the transit time of a pressure wave through the length of the transducer, and the time required for the expansion per se and the contraction per se of the transducer is short in comparison to said transit time.

5. Apparatus according to claim 1, wherein said cross-sectional expansion is spaced from said transducer to provide for superimposition of direct and reflected pressure waves as said discharge opening, so that the ejection of a droplet occurs due to the rapid reduction in pressure at the discharge opening.

6. Apparatus according to claim 1, wherein said channel is formed of an elastic material having damping properties.

7. Apparatus according to claim 6, wherein said channel has a slightly increased diameter in the location surrounding said transducer.

8. Apparatus according to claim 1, wherein said transducer is adapted to be driven by compensation pulses delayed in time relative to said drive pulse, said time delay being determined by twice the transit time of a pressure wave between the discharge opening and the cross-sectional expansion, said compensation pulses having lower energy than said drive pulses for effectively cancelling reverberation within said ink channel following droplet ejection.

9. Apparatus according to claim 8, wherein said compensation pulses correspond in shape to the reverberation pulses to be cancelled.

10. Apparatus according to claim 1, including a plurality of channels each having an individual discharge opening, each of said channels being connected at their ends opposite said discharge opening to a common fluid filled chamber, such connections constituting a cross-sectional expansion for each said channels, each channel having a transducer surrounding a part of its length in the proximity of said cross-sectional expansion, and means for connecting individual drive circuits to each of said transducers for exciting said transducers with drive pulses.

11. A method of ejecting a droplet from a fluid-filled channel having a discharge opening and a piezo-electric transducer surrounding part of its length, said transducer being adapted to change its diameter by expansion and contraction in response to drive pulses applied thereto, comprising the steps of; locating a cross-sectional expansion in the end of said channel at its end opposite said discharge opening, for reflecting and reversing the polarity of a pressure wave generated in response to driving said transducer, locating said transducer in the proximity of said cross-sectional expansion, said transducer being spaced from said cross-sectional expansion by the distance required for a pressure wave initiated by expansion of said transducer to travel from said transducer to said cross-sectional expansion and for a corresponding reflected pressure wave to travel from said cross-sectional expansion to said transducer in approximately the period of said drive pulse, applying an electrical driving pulse to said transducer to expand and then contract said transducer to produce said pressure wave, summing the pressure wave due to contraction of said transducer with the reflected pressure wave between said transducer and said discharge opening to provide a composite pressure wave to effect ejection of a single droplet, and expelling a droplet in response to said composite pressure wave.

12. The method according to claim 11, including the step of selecting the length of the transducer, the duration of the drive pulses and the spacing of said transducer from said cross-sectional expansion so that the reflected wave is superimposed on the wave proceeding directly from said transducer to said discharge opening to form a composite wave at said discharge opening which has a first phase of reduced pressure from a quiescent valve, a second phase of increased pressure, a third phase of reduced pressure, followed by a return of a quiescent pressure level.

13. The method according to claim 11, including the step of applying drive pulses which have symmetrical leading and trailing edges.

14. the method according to claim 11, including the step of applying drive pulses which have a duration which is equal to or greater than the transit time of a pressure wave through that part of the channel which is surrounded by said transducer, and which cause said transducer to expand and contract during a period which is short in comparison to said transit time.

15. The method according to claim 11, including the step of ejecting a droplet by forming at said discharge opening a pressure wave which as a phase of increased pressure and immediately following phase of reduced pressure, whereby a droplet is ejected from said discharge opening at the transition between said phases.

16. The method according to claim 11, including the step of forming said channel of an elastic material having damping properties.

17. The method according to claim 11, including the step of forming said channel with an enlarged diameter in the portion surrounded by said transducer.

18. The method according to claim 11, including the step of applying a compensation pulse to said transducer, at a time subsequent to each said drive pulse, after an interval corresponding to twice the transit time of a pressure wave between said discharge opening and said cross-sectional expansion, said compensation pulse having a lower energy than said drive pulses, whereby reverberation waves are damped.

19. The method according to claim 18, including the step of forming said compensation pulses with a duration corresponding to the pulse duration of said drive pulses.

20. The method according to claim 11, including the step of forming said channel integrally with a write head body surrounding said channel and said transducer.

* * * * *